United States Patent [19]
Inaba et al.

[11] 4,289,441
[45] Sep. 15, 1981

[54] INDUSTRIAL ROBOT

[75] Inventors: Hajimu Inaba, Hino; Shigemi Inagaki, Musashino, both of Japan

[73] Assignee: Fijutsu Fanuc Limited, Tokyo, Japan

[21] Appl. No.: 76,616

[22] Filed: Sep. 18, 1979

[30] Foreign Application Priority Data

Sep. 29, 1978 [JP] Japan ................................ 53-119155

[51] Int. Cl.$^3$ ............................................. B25J 19/00
[52] U.S. Cl. .................................. 414/589; 414/673
[58] Field of Search .................. 414/4, 589, 590, 591, 414/619, 620, 621, 673, 744 A; 187/94

[56] References Cited
FOREIGN PATENT DOCUMENTS
2903185  8/1979  Fed. Rep. of Germany ...... 414/590

*Primary Examiner*—Jeffrey V. Nase
*Attorney, Agent, or Firm*—Armstrong, Nikaido, Marmelstein & Kubovcik

[57] ABSTRACT

An industrial robot, having a robot hand mounted on a vertically movable body which is vertically moved by a vertical feed motor being provided with a load reducing means which includes a cylinder means for applying a constant upward force to the vertically movable body during the vertical movement of the body. The upward force contributes to reducing a load applied to the vertical feed motor.

4 Claims, 3 Drawing Figures

INDUSTRIAL ROBOT

FIELD OF THE INVENTION

The present invention relates to an industrial robot operating as an industrial manipulating device. More particularly, the present invention relates to an industrial robot with a load reducing means capable of reducing a load applied to a feed motor for driving a vertically movable body of the robot.

Generally, the industrial robot is employed as an industrial manipulating device adopted for, for example, a numerically controlled machine tool for the purpose of transferring a workpiece to and from the machine tool or of attaching the workpiece to and detaching the workpiece from the machine tool.

The industrial robot is provided with a robot hand capable of horizontally extending or contracting. The robot is also provided with a means for moving the robot hand in a vertical direction as well as means for rotating the robot hand in a horizontal plane, so that the robot hand is capable of being brought to the desired position. For the purpose of enabling the vertical movement of the robot hand, one or more vertical guide pillars are conventionally provided so that a vertically movable body, on which the horizontally extendible and contractable robot hand is mounted, can be vertically moved along the guide pillars by means of a feed motor. Therefore, it is necessary that the feed motor exhibit a large drive power, enough for driving the vertical movement of the vertically movable body while supporting the load of a workpiece clamped by the robot hand, the weights of the vertically movable body and the robot hands, and the mechanical moment acting on the vertically movable body. As a result, it is often difficult to apply a conventionally used motor to the industrial robot.

SUMMARY OF THE INVENTION

An object of the present invention is to provide an industrial robot which is provided with a novel means for reducing an entire load applied to the feed motor for driving the vertically movable body of the industrial robot.

In accordance with the present invention, an industrial robot having a robot hand which is mounted on a vertically movable body moved along a vertical guide pillar or pillars by means of a vertical feed motor is characterized by comprising a cylinder means for applying an upward force to the above-mentioned vertically movable body thereby reducing a load applied to the vertical feed motor. The cylinder means is connected to a pressure source. Preferably, a reducing valve with a relief circuit is provided between the cylinder means and the pressure source, so that a predetermined upward force is always applied to the vertically movable body. The cylinder means may be of a pneumatic type cylinder.

DESCRIPTION OF THE DRAWINGS

The above and other objects and features of the present invention will become apparent from the ensuing description of an embodiment with reference to the accompanying drawings; wherein:

Referring now to FIG. 1, a conventional industrial robot has a base 10 fixed to the surface of a floor. On the base 10, a control box 12 is mounted, in which a control device (not shown) for the robot is stored. A fixed casing 14 is also mounted on the base 10. The fixed casing 14 stores therein a turning mechanism for turning a robot arm 22, as described hereinafter, about a vertical axis. The turning mechanism is driven by a motor 32. On the upward side of the fixed casing 14, a rotary table 16 is mounted, which is directly rotated by the above-mentioned turning mechanism. A pair of vertical guide pillars 18 is fixed to the upper surface of the rotary table 16, and a lower end of a ball screw shaft 28 is rotatably supported on the upper surface of the rotary table 16. The upper ends of the guide pillars 18 as rigidly supported by an upper plate 30. The upper end of the ball screw shaft 28 extends upwardly through the upper plate 30, and is connected to a vertical feed motor 34, via a reduction gear 36. Therefore, the ball screw shaft 28 is rotated by the vertical feed motor 34. A vertically movable body 20 is threadedly engaged with the ball screw shaft 28 and is vertically moved in response to the rotation of the ball screw shaft 28 under the guide of the guide pillars 18. Thus, the vertically movable body 20 is slidably engaged with the guide pillars 18 via an appropriate bearing means, such as, for example, conventional slide bearings. To the vertically movable body 20, a robot arm 22, which is capable of horizontally extending and contracting, is fixedly attached, and the robot arm 22 is provided, at the outer end thereof, with a robot hand 24. Reference numeral 26 designates a workpiece gripped by the robot hand 24. The horizontal extending and contracting movement of the robot arm 22 is driven by a motor 37 usually comprised of a servo motor, via a ball screw mechanism housed in the inside of the vertically movable body 20. In the above-described conventional industrial robot, the vertical feed motor 34 is needed to exhibit an output power so as to vertically move the vertically movable body 20 while overcoming the weight of the body 20 per se and the weights of the robot arm 22, the robot hand 24 and the workpiece 26. Further, the output power of the vertical feed motor 34 is also large enough for overcoming a frictional resistance caused by a mechanical moment which is produced by the above-mentioned weights and is applied to the bearing means on the vertical guide pillars 18 during the vertical movement of the vertically movable body 20. Therefore, the output power of the vertical feed motor 34 of the conventional industrial robot must be considerably large in comparison with that of a commercially available motor of low cost.

The present invention is able to provide an industrial robot which is capable of incorporating therein a commercially available motor as a vertical feed motor.

Figure 1:
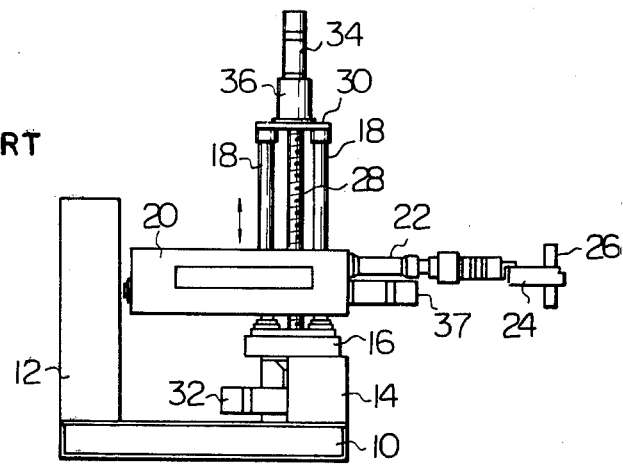
FIG. 1 is a front view illustrating the construction of a conventional industrial robot.
Figure 2:
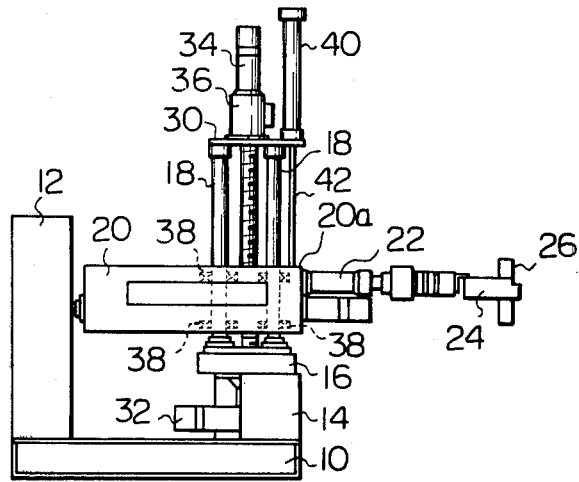
FIG. 2 is a front view illustrating the construction of an industrial robot with a load reducing means, according to the present invention.

In FIG. 2, illustrating the construction of an industrial robot of the present invention, the same or like elements or parts as those of the robot of FIG. 1 are designated by the same reference numerals as those of FIG. 1. In FIG. 2, reference numeral 38 designates the above-described bearing means intervened between the vertical guide pillars 18 and the vertically movable body 20. In the embodiment of the present invention, shown in FIG. 2, a pneumatic cylinder 40 is fixed to the upper plate 30. The pneumatic cylinder 40 has a vertical cylinder rod 42 a lower end of which is connected to an upper end 20a of the vertically movable body 20 by means of an appropriate connecting means which is comprised of, for example, connecting pins. The pneumatic cylinder 40 is capable of always applying an upward force to the body 20, if pressurized air is always supplied to the cylinder 40 so that the vertical cylinder rod 42 is upwardly withdrawn by the pneumatic cylinder 40. Therefore, if the magnitude of the upward force is selected to correspond to the total weights of the body 20, the robot arm 22 and the robot hand 24, the vertical feed motor 34 is needed to exhibit an output power enough for overcoming only the weight of the workpiece 26 and the frictional resistance applied to the bearing means 38, while the motor 34 moves the vertically movable body 20. As a result, it is possible to reduce a load directly applied to the feed motor 34 in comparison with the construction of the conventional industrial robot. Of course, it is also possible to reduce the load which is applied to the motor 34 due to the weight of the workpiece 26, if the upward force exhibited by the pneumatic cylinder 40 is adjusted so as to compensate for the weight of the workpiece 26. In addition, it is also possible to adjust the upward force exhibited by the pneumatic cylinder 40 so that the frictional resistance produced by the mechanical moment which is applied to the bearing means 38 is also compensated for. It should be noted that the position of the upper end 20a where the cylinder rod 42 of the pneumatic cylinder 40 is connected to the vertically movable body 20 should be selected so as to be an optimum position for minimizing the above-mentioned mechanical moment.

Figure 3:
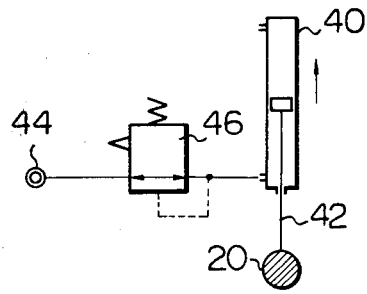
FIG. 3 is a circuit diagram of a constant air pressure supply circuit employed for the load reducing means of FIG. 2.

Referring now to FIG. 3 which schematically illustrates an air supply circuit connected to the pneumatic cylinder 40, the vertically movable body 20 of FIG. 2 is schematically illustrated as a weight-like body 20 connected to the cylinder rod 42 of the pneumatic cylinder 40. In FIG. 3, the cylinder 40 is connected to an air source 44, via a reducing valve 46 with a relief circuit, so that pressurized air is supplied from the source 44 to the pneumatic cylinder 40. In this air supply circuit, an intervention of the reducing valve 46 with a relief circuit between the air source and the pneumatic cylinder 40 makes it possible to maintain a constant level of the upward force applied from the cylinder 40 to the vertically movable body 20, even while the body 20 per se is moving in a vertical direction. This is because the pressure level of the pressurized air supplied to the cylinder 40 can be appropriately adjusted by the valve 46, so that the pneumatic cylinder 40 always exerts a constant output power on the cylinder rod 42 during the movement of the rod 42. Further, it should be understood that the pressure level of the pressurized air should be adjusted by the reducing valve 46, so that an appropriate upward force is applied from the pneumatic cylinder 40 to the vertically movable body 20, even if the load applied to the feed motor 34 (FIG. 2) changes due to the horizontal extending and contracting movement of the robot arm 22 (FIG. 2) and the robot hand 24 (FIG. 2).

It should be appreciated that the embodiment of employing the above-mentioned pneumatic cylinder 40 may be replaced by the other embodiment in which a hydraulic cylinder supplied with pressurized oil is employed for applying an upward force to the vertically movable body of the industrial robot of the present invention. Further, in the described embodiment, the pneumatic cylinder 40 is arranged so as to apply an upwardly withdrawing force to the movable body 20. This arrangement may be modified so that the pneumatic cylinder 40 applies an upwardly pressing force to the movable body 20. This modified arrangement may be easily realized by attaching the pneumatic cylinder 40 to the base 10.

From the foregoing description of the embodiment of the present invention, it will be understood that the load applied to the vertical feed motor of the industrial robot can be reduced by the load reducing means of the present invention. Therefore, the output power of the vertical feed motor can be considerably smaller in comparison of that of the motor employed for the conventional industrial robot. As a result, a low cost commercially available motor can be used as a vertical feed motor for driving the robot arm and robot hand of the industrial robot. Consequently, the design and manufacturing of an industrial robot can be low in cost.

What is claimed is:

1. In an industrial robot having a robot hand, a vertically movable body on which the robot hand is mounted, a vertical drive means for causing a vertical movement of the vertically movable body guided by at least one vertical guide pillar, said vertical drive means including a feed motor, and a cylinder means for applying an upward force to said vertically movable body to thereby reduce the load applied by said vertically movable body and robot hand to said feed motor.

2. An industrial robot according to claim 1, wherein said cylinder means is connected to a pressure source via a reducing valve with a relief circuit, said reducing valve operating so as to maintain a constant level of pressure supplied from said pressure source to said cylinder means.

3. An industrial robot according to claim 1, wherein said cylinder means comprises a pneumatic cylinder.

4. An industrial robot according to claim 1, wherein said cylinder means is fixedly arranged above said vertically movable body, and has a cylinder rod on the lowermost end of which is connected to a part of said vertically movable body.

* * * * *